(12) United States Patent
Xu

(10) Patent No.: US 11,582,758 B2
(45) Date of Patent: Feb. 14, 2023

(54) METHOD, APPARATUS AND TERMINAL FOR SERVICE TRANSMISSION

(71) Applicant: GUANGDONG OPPO MOBILE TELECOMMUNICATIONS CORP., LTD., Dongguan (CN)

(72) Inventor: Jing Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/950,868

(22) Filed: Nov. 17, 2020

(65) Prior Publication Data

US 2021/0068114 A1 Mar. 4, 2021

Related U.S. Application Data

(63) Continuation of application No. PCT/CN2019/087840, filed on May 21, 2019.
(Continued)

(51) Int. Cl.
| | | |
|---|---|---|
| H04W 56/00 | (2009.01) | |
| H04W 72/04 | (2023.01) | |
| H04W 76/27 | (2018.01) | |
| H04W 72/0446 | (2023.01) | |
| H04W 72/14 | (2009.01) | |
| H04W 80/02 | (2009.01) | |

(52) U.S. Cl.
CPC ..... *H04W 72/0493* (2013.01); *H04W 72/042* (2013.01); *H04W 72/0446* (2013.01); *H04W 72/14* (2013.01); *H04W 76/27* (2018.02); *H04W 80/02* (2013.01)

(58) Field of Classification Search
CPC ............. H04W 72/0493; H04W 76/27; H04W 72/042; H04W 72/0446; H04W 72/14; H04W 80/02
USPC .......................................................... 370/329
See application file for complete search history.

(56) References Cited

U.S. PATENT DOCUMENTS

| 9,674,194 B1 | 6/2017 | McClintock et al. |
| 2018/0115988 A1 | 4/2018 | Lee et al. |

(Continued)

FOREIGN PATENT DOCUMENTS

| CN | 101568148 A | 10/2009 |
| CN | 101827447 A | 9/2010 |

(Continued)

OTHER PUBLICATIONS

Supplementary European Search Report issued in corresponding European Application No. EP 19 80 8195, dated May 6, 2021, 10 pages.

(Continued)

*Primary Examiner* — Sai Ming Chan
(74) *Attorney, Agent, or Firm* — Bayes PLLC

(57) ABSTRACT

Embodiments of the present disclosure provide a method, an apparatus, and a terminal for service transmission. The method includes determining which service is allowed to be transmitted on configured grant resource, according to a first indication information. By determining the service allowed to be transmitted on the configured grant resource, the mapping relationship between service types and uplink grant types is specified.

20 Claims, 2 Drawing Sheets

Related U.S. Application Data

(60) Provisional application No. 62/674,087, filed on May 21, 2018.

(56) References Cited

U.S. PATENT DOCUMENTS

| | | | | |
|---|---|---|---|---|
| 2019/0230654 A1* | 7/2019 | Luo | ......................... | H04W 4/40 |
| 2019/0289638 A1* | 9/2019 | Kung | ..................... | H04W 28/04 |
| 2019/0342941 A1* | 11/2019 | Tang | ...................... | H04W 76/11 |
| 2020/0029237 A1* | 1/2020 | Kim | ....................... | H04W 68/02 |

FOREIGN PATENT DOCUMENTS

| | | |
|---|---|---|
| CN | 103298130 A | 9/2013 |
| CN | 106507497 A | 3/2017 |
| CN | 107078893 A | 8/2017 |
| CN | 108141860 A | 6/2018 |
| CN | 109392099 A | 2/2019 |
| RU | 2360369 C2 | 6/2009 |
| RU | 2448418 C2 | 4/2012 |
| WO | 2017135703 A1 | 8/2017 |
| WO | 2017192082 A1 | 11/2017 |
| WO | 2018062847 A1 | 4/2018 |
| WO | 2019/223698 A1 | 11/2019 |

OTHER PUBLICATIONS

"Remaining issues on UL data transmission for URLLC", Agenda: 7.1.3.3.4, Source: vivo, 3GPP TSG RAN WG1 Meeting #92bis, R1-1806070, Busan, Korea, May 21-25, 2018, 5 pages.

"Support of multiple SR configurations", Agenda Item: 10.3.1.5, Source: Huawei, HiSilicon, 3GPP TSG-RAN2 Meeting #NR_AHs, R2-1706900, Qingdao, China, Jun. 27-29, 2017, 5 pages.

"Layer 2 Design for Multiple Services (Numerologies)", Agenda: 9.2.1.2, Source: Samsung, 3GPP TSG-RAN WG2 Meeting #96, R2-168851, Reno, USA, Nov. 14-18, 2016, 5 pages.

PCT Written Opinion of the International Searching Authority issued in corresponding International Application No. PCT/CN2019/087840, dated Jul. 29, 2019, 3 pages.

First Office action issued in corresponding India Application No. 202017050755, dated Dec. 10, 2021, 5 pages.

Communication pursuant to Article 94(3) EPC issued in corresponding European Application No. 198081095.2, dated Jan. 25, 2022, 7 pages.

First Office Action issued in corresponding Chinese Application No. 202110099118.4, dated Jul. 13, 2022, 23 pages.

Communication pursuant to Article 94(3) EPC issued in corresponding European Application No. 19808195.2, dated Jul. 6, 2022, 8 pages.

"Collision between dynamic grant and configured grant", R2-1800902, Source: vivo, 3GPP TSG-RAN WG2 NR Ad hoc 1801, Vancouver, Canada, Jan. 22-26, 2018, 2 pages.

First Office Action issued in corresponding Singaporean Application No. 11202011548T, dated Jul. 29, 2022.

First Office Action issued in corresponding Russian Application No. 2020141436, dated Oct. 12, 2022.

* cited by examiner

METHOD, APPARATUS AND TERMINAL FOR SERVICE TRANSMISSION

CROSS-REFERENCE TO RELATED APPLICATIONS

This application is a continuation application of International Application No. PCT/CN2019/087840, filed May 21, 2019, which claims the benefit of priority to U.S. Provisional Application No. 62/674,087, filed May 21, 2018, both of which are incorporated herein by reference in their entireties.

BACKGROUND

The present disclosure relates to the field of wireless communication technologies, and more particularly, to a method, an apparatus, and a terminal for service transmission.

In the access network of the fifth generation of mobile communication systems (5G), the transmission resource for uplink service/traffic data between the base station and the terminal device includes two types: dynamic grant resource with dynamic scheduling and configured grant resource without dynamic scheduling.

As to the dynamic grant resource, the base station can dynamically allocate resources to terminal devices via the C-RNTI (Cell Radio Network Temporary Identifier) on PDCCH(s) (Physical Downlink Control Channel). A terminal device always monitors the PDCCH(s) in order to find possible grants for uplink transmission.

In addition, with configured grant resources, the base station can allocate uplink resources to terminal devices. There are two types of uplink configured grant resources: Type 1 and Type 2. With type 1, RRC (Radio Resource Control) signaling(s) directly provides the configured grant (including the periodicity); with type 2, RRC signaling(s) provides the periodicity of the configured grant resource while PDCCH addressed to CS-RNTI (Configured Scheduling RNTI) can either signal and activate the configured grant, or deactivate it; i.e., a PDCCH addressed to CS-RNTI indicates that the uplink grant can be implicitly reused according to the periodicity defined by RRC until deactivated.

In the existing protocols, the dynamically allocated uplink transmission (the dynamic grant) overrides the configured grant in the same serving cell, if they overlap in time. Otherwise, an uplink transmission according to the configured grant is assumed if activated. However, there are no clear rules on which service/traffic data can use configured grant resource and which service/traffic data can use dynamic resources. As a result, when the configured grant conflicts with the dynamic grant, the dynamic grant may not meet the QoS of the services with strict delay requirements. In addition, the configured grant resource also may not meet the QoS of some services because the base station is unclear about the requirements of the services to be transmitted in the terminal device.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a method, an apparatus, and a terminal for determining uplink grants for services.

In a first aspect, the present disclosure provides a method for service transmission, which may comprise determining which service is allowed to be transmitted on resource indicated by configured grant resource, according to a first indication information.

In an embodiment of the present disclosure, the method may further comprise transmitting the service allowed to be transmitted on the configured grant resource.

In an embodiment of the present disclosure, the first indication information is comprised in a LogicalChannelConfig information element.

In an embodiment of the present disclosure, the first indication information is the configuredGrantType1Allowed element in LogicalChannelConfig information element.

In an embodiment of the present disclosure, the first indication information comprises at least one of the following information: TTI length, PDSCH type, periodicity, or MCS table.

In an embodiment of the present disclosure, when the service allowed to be transmitted on the configured grant resource is URLLC service, wherein the first indication information comprises at least one of the following information: short TTI length, PDSCH type B, short periodicity, or configuration of MCS table for URLLC service.

In an embodiment of the present disclosure, the first indication information is service type information included in an RRC signaling.

In an embodiment of the present disclosure, the first indication information is RNTI used for DCI signaling of the service allowed to be transmitted on the configured grant resource.

In an embodiment of the present disclosure, the first indication information is included in the configuration information for each logical channel and is configured to indicate whether MAC SDUs from the configured logical channel is allowed to be transmitted on the configured grant resource.

In an embodiment of the present disclosure, the configured grant resource include resource configured for configured grant type 1 or resource configured for configured grant type 2; and the first indication information is configured to indicate whether MAC SDUs from the logical channel is allowed to be transmitted on the resource configured for configured grant type 1 or the resource configured for configured grant type 2, respectively.

In an embodiment of the present disclosure, the first indication information is further configured to indicate whether MAC SDUs from the logical channel is allowed to be transmitted on the dynamic grant resource.

In an embodiment of the present disclosure, if a logical channel is configured that MAC SDUs from the logical channel can be transmitted either on the configured grants or on the dynamic grant resource when the configured grant resource and the dynamic grant resource conflict on the time domain, the MAC SDU from the logical channel should be transmitted on the configured grant resource.

In an embodiment of the present disclosure, the first indication information includes at least one of first sub-indication information, second sub-indication information, and third sub-indication information; the first sub-indication information is configured to indicate the length of each of the configured grant resource in the time domain; the second sub-indication information is configured to indicate periodicity of the configured grant resource; and the third sub-indication information is configured to indicate the MCS table a terminal device shall use for the configured grant resource.

In an embodiment of the present disclosure, if the length indicated by the first sub-indication information is less than or equal to a predefined first threshold, the first service type is allowed to be transmitted on the configured grant resource; otherwise, the second service type is allowed to be transmitted on the configured grant resource.

In an embodiment of the present disclosure, if the length indicated by the first sub-indication information is less than or equal to a predefined first threshold, both first service type and second service type are allowed to be transmitted on the conjured uplink grants; otherwise, the second service type is allowed to be transmitted on the configured grant resource.

In an embodiment of the present disclosure, if the length indicated by the second sub-indication information is less than or equal to a predefined second threshold, the first service type is allowed to be transmitted on the configured grant resource; otherwise, the second service type is allowed to be transmitted on the configured grant resource.

In an embodiment of the present disclosure, if the length indicated by the second sub-indication information is less than or equal to a predefined second threshold, both the first service type and the second service type are allowed to be transmitted on the configured grant resource; otherwise, the second service type is allowed to be transmitted on the configured grant resource.

In an embodiment of the present disclosure, if the value indicated by the third sub-information is configured as a predefined MCS, the first service type is allowed to be transmitted on the configured grant resource; otherwise, the second service type is allowed to be transmitted on the configured grant resource.

In an embodiment of the present disclosure, if the value indicated by the third sub-information is configured as a predefined MCS, both the first service type and the second service type are allowed to be transmitted on the configured grant resource; otherwise, the second service type is allowed to be transmitted on the configured grant resource.

In an embodiment of the present disclosure, the first service type has stricter delay requirements than the second service type.

In an embodiment of the present disclosure, the first indication information includes grant configuration information, and the grant configuration information includes a service indication that is configured to indicate which service is allowed to be transmitted on the configured grant resource.

In an embodiment of the present disclosure, the configured grant resource includes resource configured for configured grant type 1 and/or resource configured for configured grant type 2.

In an embodiment of the present disclosure, wherein the first indication information is a DCI for activating configured grant type 2, and which service is allowed to be transmitted on the configured grant resource is determined according to the RNTI scrambled for the DCI, and/or determined according to the DCI format.

In the second aspect, the present disclosure provides an apparatus for service transmission, which may comprise a determining module; wherein the determining module is configured to determine which service is allowed to be transmitted on the configured grant resource, according to a first indication information.

In an embodiment of the present disclosure, the apparatus may further comprise a transmitting module, which is configured to transmit the service allowed to be transmitted on the configured grant resource.

In an embodiment of the present disclosure, the first indication information is comprised in a LogicalChannelConfig information element.

In an embodiment of the present disclosure, the first indication information is the configuredGrantType1Allowed element in LogicalChannelConfig information element.

In an embodiment of the present disclosure, the first indication information comprises at least one of the following information: TTI length, PDSCH type, periodicity or MCS table.

In an embodiment of the present disclosure, when the service allowed to be transmitted on the configured grant resource is URLLC service, wherein the first indication information comprises at least one of the following information: short TTI length, PDSCH type B, short periodicity, or configuration of MCS table for URLLC service.

In an embodiment of the present disclosure, the first indication information is service type information included in an RRC signaling.

In an embodiment of the present disclosure, the first indication information is RNTI used for DCI signaling of the service allowed to be transmitted on the configured grant resource.

In an embodiment of the present disclosure, the first indication information is included in the configuration information for each logical channel and is configured to indicate whether MAC SDUs from the configured logical channel is allowed to be transmitted on the configured grant resource.

In an embodiment of the present disclosure, the configured grant resource include resource configured for configured grant type 1 or resource configured for configured grant type 2; and the first indication information is configured to indicate whether MAC SDUs from the logical channel is allowed to be transmitted on the resource configured for configured grant type 1 or the resource configured for configured grant type 2, respectively.

In an embodiment of the present disclosure, the first indication information is further configured to indicate whether MAC SDUs from the logical channel is allowed to be transmitted on dynamic grant resource.

In an embodiment of the present disclosure, the determining module is configured to determine if a logical channel is configured that MAC SDUs from the logical channel can be transmitted either on the configured grant resource or on the dynamic grant resource when the configured grant resource and the dynamic grant resource conflict on the time domain, the MAC SDU from the logical channel should be transmitted on the configured grant resource.

In an embodiment of the present disclosure, the first indication information includes at least one of first sub-indication information, second sub-indication information, and third sub-indication information; the first sub-indication information is configured to indicate the length of each of the configured grant resource in the time domain; the second sub-indication information is configured to indicate periodicity for the configured grant resource; and the third sub-indication information is configured to indicate the MCS table a terminal device shall use for the configured grant resource.

In an embodiment of the present disclosure, the determining module is configured to determine that if the length indicated by the first sub-indication information is less than or equal to a predefined first threshold, the first service type is allowed to be transmitted on the configured grant resource; otherwise, the second service type is allowed to be transmitted on the configured grant; and the first service type has stricter delay requirements than the second service type.

In an embodiment of the present disclosure, the determining module is configured to determine that if the length indicated by the first sub-indication information is less than or equal to a predefined first threshold, both first service type and second service type are allowed to be transmitted on the conjured uplink grants; otherwise, the second service type is allowed to be transmitted on the configured grant resource.

In an embodiment of the present disclosure, the determining module is configured to determine that if the length indicated by the second sub-indication information is less than or equal to a predefined second threshold, the first service type is allowed to be transmitted on the configured grant resource; otherwise, the second service type is allowed to be transmitted on the configured grant resource.

In an embodiment of the present disclosure, the determining module is configured to determine that if the length indicated by the second sub-indication information is less than or equal to a predefined second threshold, both the first service type and the second service type are allowed to be transmitted on the configured grant resource; otherwise, the second service type is allowed to be transmitted on the configured grant resource.

In an embodiment of the present disclosure, the determining module is configured to determine that if the value of the third sub-information is configured as a predefined MCS, the first service type is allowed to be transmitted on the configured grant resource; otherwise, the second service type is allowed to be transmitted on the configured grant resource.

In an embodiment of the present disclosure, the determining module is configured to determine that if the value indicated by the third sub-information is configured as a predefined MCS, both first service type and second service type are allowed to be transmitted on the configured grant resource; otherwise, the second service type is allowed to be transmitted on the configured grant resource.

In an embodiment of the present disclosure, the first service type has stricter delay requirements than the second service type.

In an embodiment of the present disclosure, the first indication information includes grant configuration information, and the grant configuration information includes a service indication, which is configured to indicate which service is allowed to be transmitted on the configured grant resource.

In an embodiment of the present disclosure, the configured grant resource includes resource configured for configured grant type 1 and/or resource configured for configured grant type 2.

In an embodiment of the present disclosure, the first indication information is a DCI for activating configured grant type 2, and the determining module is configured to determine which service is allowed to be transmitted on the configured grant resource is determined according to the RNTI scrambled for the DCI, and/or determined according to the DCI format.

In the third aspect, the present disclosure provides a terminal device, which may comprise: a receiver and a processor; wherein the receiver is configured to receive a first indication information; and the processor is configured to determine which service is allowed to be transmitted on configured grant resource, according to received first indication information.

In an embodiment of the present disclosure, the terminal device may further comprise a transmitter, which is configured to transmit the service allowed to be transmitted on the configured grant resource.

In an embodiment of the present disclosure, the first indication information is comprised in a LogicalChannelConfig information element.

In an embodiment of the present disclosure, the first indication information is the configuredGrantType1Allowed element in LogicalChannelConfig information element.

In an embodiment of the present disclosure, the first indication information comprises at least one of the following information: TTI length, PDSCH type, periodicity, or MCS table.

In an embodiment of the present disclosure, when the service allowed to be transmitted on the configured grant resource is URLLC service, wherein the first indication information comprises at least one of the following information: short TTI length, PDSCH type B, short periodicity, or configuration of MCS table for URLLC service.

In an embodiment of the present disclosure, the first indication information is service type information included in an RRC signaling.

In an embodiment of the present disclosure, the first indication information is RNTI used for DCI signaling of the service allowed to be transmitted on the configured grant resource.

In an embodiment of the present disclosure, the first indication information is included in the configuration information for each logical channel and is configured to indicate whether MAC SDUs from the configured logical channel is allowed to be transmitted on the configured grants.

In an embodiment of the present disclosure, the configured grant resource include resource configured for configured grant type 1 or resource configured for configured grant type 2; and the first indication information is configured to indicate whether MAC SDUs from the logical channel is allowed to be transmitted on the resource configured for configured grant type 1 or the resource configured for configured grant type 2, respectively.

In an embodiment of the present disclosure, the first indication information is further configured to indicate whether MAC SDUs from the logical channel is allowed to be transmitted on dynamic grant resource.

In an embodiment of the present disclosure, the processor is configured to determine that if a logical channel is configured that MAC SDUs from the logical channel can be transmitted either on the configured grant resource or on the dynamic grant resource when the configured grant resource and the dynamic grant resource conflict on the time domain, the MAC SDU from the logical channel should be transmitted on the configured grant resource.

In an embodiment of the present disclosure, the first indication information includes at least one of first sub-indication information, second sub-indication information, and third sub-indication information; the first sub-indication information is configured to indicate the length of each of the configured grant resource in the time domain; the second sub-indication information is configured to indicate periodicity of the configured grant resource; and the third sub-indication information is configured to indicate the MCS table a terminal device shall use for the configured grant resource.

In an embodiment of the present disclosure, the processor is configured to determine that if the length indicated by the first sub-indication information is less than or equal to a predefined first threshold, the first service type is allowed to be transmitted on the configured grant resource; otherwise, the second service type is allowed to be transmitted on the configured grant resource.

In an embodiment of the present disclosure, the processor is configured to determine that if the length indicated by the first sub-indication information is less than or equal to a predefined first threshold, both first service type and second service type are allowed to be transmitted on the conjured uplink grants; otherwise, the second service type is allowed to be transmitted on the configured grant resource.

In an embodiment of the present disclosure, the processor is configured to determine that if the length indicated by the second sub-indication information is less than a predefined second threshold, the first service type is allowed to be transmitted on the configured grant resource; otherwise, the second service type is allowed to be transmitted on the configured grant resource.

In an embodiment of the present disclosure, the processor is configured to determine that if the length indicated by the second sub-indication information is less than or equal to a predefined second threshold, both the first service type and the second service type are allowed to be transmitted on the configured grant resource; otherwise, the second service type is allowed to be transmitted on the configured grant resource.

In an embodiment of the present disclosure, the processor is configured to determine that if the value of the third sub-information is configured as a predefined MCS, the first service type is allowed to be transmitted on the configured grant resource; otherwise, the second service type is allowed to be transmitted on the configured grant resource.

In an embodiment of the present disclosure, the processor is configured to determine that if the value indicated by the third sub-information is configured as a predefined MCS, both the first service type and the second service type are allowed to be transmitted on the configured grant resource; otherwise, the second service type is allowed to be transmitted on the configured grant resource.

In an embodiment of the present disclosure, the first service type has stricter delay requirements than the second service type.

In an embodiment of the present disclosure, the first indication information includes grant configuration information, and the grant configuration information includes a service indication, which is configured to indicate which service is allowed to be transmitted on the configured grant resource.

In an embodiment of the present disclosure, the configured grant resource includes resource configured for configured grant type 1 and/or resource configured for configured grant type 2.

In an embodiment of the present disclosure, the first indication information is a DCI for activating configured grant type 2, and the processor is configured to determine which service is allowed to be transmitted on the configured grant resource is determined according to the RNTI scrambled for the DCI, and/or determined according to the DCI format.

This section provides a summary of various implementations or examples of the technology described in the present disclosure, and is not a comprehensive disclosure of the full scope or all features of the disclosed technology.

BRIEF DESCRIPTION OF THE DRAWINGS

To describe the technical solutions in the embodiments of the present disclosure more clearly, the following will briefly introduce the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
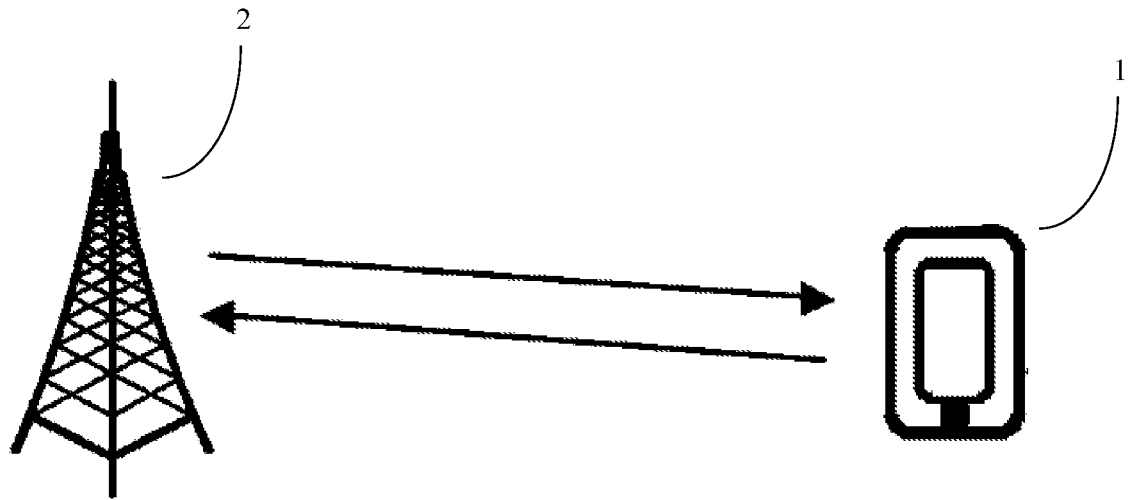
FIG. 1 schematically illustrates an example scenario under schemes in accordance with implementations of the present disclosure.

Exemplary embodiments of the disclosure will now be described more fully with reference to the accompanying drawings, in which exemplary embodiments are shown. Exemplary embodiments of the disclosure may, however, be embodied in many different forms and should not be construed as being limited to the embodiments set forth herein; rather, these embodiments are provided so that this disclosure will be thorough and complete, and will fully convey the concept of exemplary embodiments to those skilled in the art. In the drawings, the thicknesses of layers and regions are exaggerated for clarity. Like reference numerals in the drawings denote like elements, and thus their description will be omitted.

The described features, structures, or/and characteristics of the disclosure may be combined in any suitable manner in one or more embodiments. In the following description, numerous specific details are disclosed to provide a thorough understanding of embodiments of the disclosure. One skilled in the relevant art will recognize, however, that the disclosure may be practiced without one or more of the specific details, or with other methods, components and so forth. In other instances, well-known structures, materials, or operations are not shown or described in detail to avoid obscuring aspects of the disclosure.

In the present disclosure, terms such as "connected" and the like should be understood broadly, and may be directly connected or indirectly connected through an intermediate medium, unless otherwise specified. The specific meanings of the above terms in the present disclosure can be understood by those skilled in the art on a case-by-case basis.

Further, in the description of the present disclosure, the meaning of "a plurality" is at least two, for example, two, three, etc., unless specifically defined otherwise. "And/or," describing the association relationship of the associated objects, indicates that there may be three relationships, such as A and/or B, which may indicate that there are three cases of single A, single B, and both A and B. The symbol "/" generally indicates that the contextual object is an "or" relationship. The terms "first" and "second" are used for descriptive purposes only and are not to be construed as indicating or implying relative importance or implicitly indicating the number of technical features indicated. Thus, features defining "first" and "second" may include one or more of the features either explicitly or implicitly.

It is to be understood that the technical solutions of the present disclosure may be used in various wireless communication systems, for example, Global System of Mobile communication (GSM), General Packet Radio Service (GPRS), Wideband Code Division Multiple Access (WCDMA), High-Speed Packet Access (HSPA), Long Term Evolution (LTE), LTE-Advanced (LTE-A), New Radio (NR) and so on. Furthermore, the communication between a terminal device and a network device in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future.

It is to be understood that the term "terminal device" refers to any end device that can access a wireless communication network and receive services therefrom. The terminal device may include user equipment (UE), which is also referred to as a mobile terminal or mobile user equipment, and so on. The user equipment may be a mobile terminal such as a mobile telephone (also referred to as a cellular telephone) or a computer having a mobile terminal such as portable, pocket, hand-held, vehicle-mounted mobile apparatuses, or a mobile apparatus with a built-in computer.

It is to be understood that the term "network device" refers to a device in a wireless communication network via which a terminal device accesses the network and receives services therefrom. The network device may include a base station (BS), an access point (AP), a Mobile Management Entity (MME), a Multi-cell/Multicast Coordination Entity (MCE), an Access and Mobility Management Function (AMF)/User Plane Function (UPF), a gateway, a server, a controller or any other suitable device in the wireless communication network. The BS may be, for example, a base transceiver station (BTS) in the GSM or the CDMA, or may be a Node B in the WCDMA, or may be an evolutional Node B (eNB or e-NodeB) in the LTE or the LTE-A, or may be a gNB in the NR, and the present disclosure is not limited thereto. However, for ease of description, reference is made in the following embodiments taking the gNB as an example.

The Enhanced Mobile Broadband (eMBB) service and the Ultra-Reliable and Low-Latency Communication (URLLC) are defined by the International Telecommunication Union (ITU) for the 5G mobile communication system. The eMBB service usually has a large amount of data but with low reliability and transmission delay requirement. For example, the eMBB service needs to achieve certain reliability within 20 ms, such as the reliability of the initial transmission is 90%. The URLLC service has strict requirements for reliability and transmission delay. For example, the URLLC service needs to achieve 99.999% reliability within 1 ms.

Typically, the eMBB service data and the URLLC service data would be transmitted on different logical channels (LCH). However, at present, there is no clear definition of the mapping relationship between the types of service (e.g., the eMBB service and the URLLC service) and the types of uplink transmission grant (e.g., the configured grant and the dynamic grant).

Before introducing the method of the embodiments of the present disclosure, an example scenario is briefly described. FIG. 1 schematically illustrates an example scenario under schemes in accordance with implementations of the present disclosure.

Referring to FIG. 1, the scenario involves a UE 1 and a network device 2, which may be a part of a wireless communication network, e.g., an LTE network, an LTE-A network, an LTE-Advanced Pro network, a 5G network, an NR network, an IoT network or an NB-IoT network.

The UE 1 may comprise a protocol stack for the control plane, which includes a plurality of layers, such as a radio resource control (RRC) layer, a packet data convergence protocol (PDCP) layer, a medium access control (MAC) layer, and a physical (PHY) layer. And the UE may also include a protocol stack for the user plane, which includes a plurality of layers, such as a service data adaptation protocol (SDAP) layer, a PDCP layer, an RLC layer, a MAC layer, and a PHY layer.

In the protocol stack for the user plane, the PHY layer offers to the MAC layer transport channels, the MAC layer offers to the RLC layer logical channels, the RLC layer offers to the PDCP layers RLC channels, the PDCP layer offers to the SDAP layer radio bearers, and the SDAP layer offers to 5G core network QoS flows.

The main services and functions of SDAP may include mapping between a QoS flow and a data radio bearer and marking QoS flow ID (QFI) in both DL and UL packets. The PDCP layer may comprise PDCP entities to receive data from the upper layer (e.g., RRC layer or the SDAP layer) via the signaling radio bearers (SRBs) or data radio bearers (DRBs). The RLC layer may comprise RLC entities to receive data from the PDCP layer and transmit data to the MAC layer via logical channels. The MAC layer may comprise a MAC entity to schedule/multiplex data and transmit MAC PDUs to the physical layer.

The network device 2 may transmit an uplink grant to the UE 1. The uplink grant may indicate uplink transmission resources for the UE. The uplink grant may comprise the configurations, such as time-frequency domain resource configuration, modulation, and coding scheme (MCS), reference signal configuration, multiple-antenna configuration, HARQ configuration, etc.

The uplink grant may include configured grant and dynamic grant. The dynamic grant is configured by the network device 2 based on UE 1's request. The UE 1 may transmit a request (e.g., SR or BSR) to the network device 2. And the network device 2 may allocate a dynamic grant for the requested UE through DCI signaling carried on the PDCCH (Physical Downlink Control Channel). The configured grant is pre-configured by the network device 2 without a prior request. The UE 1 may directly use the configured grant to transmit uplink data without request.

The UE 2 may receive the configured grant via RRC signaling or DCI signaling (PHY signaling). For example, the configured grant may comprise a first configured grant type (e.g., a configured grant type 1) which is fully configured by RRC signaling. The configured grant may also comprise a second configured grant type (e.g., a configured grant type 2) which is partially configured by RRC signaling and provided by DCI signaling. And the second configured grant type may be activated or deactivated by DCI signaling.

Figure 2:
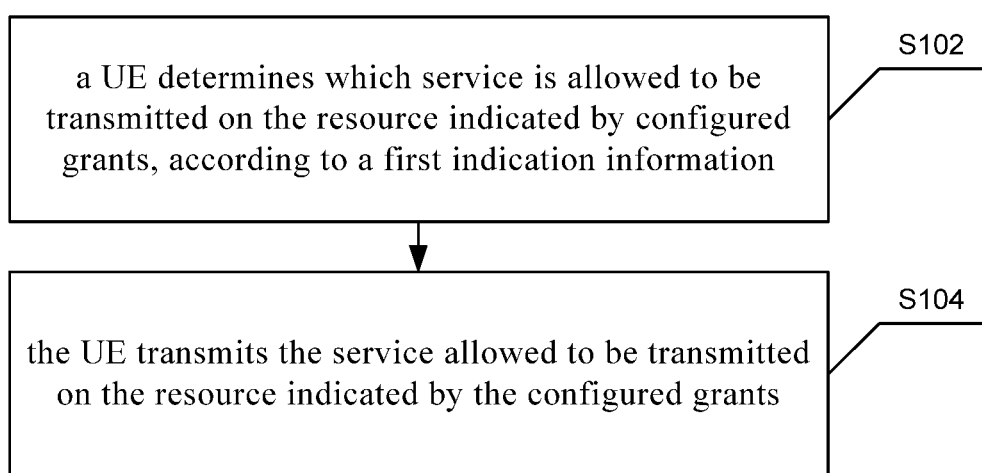
FIG. 2 schematically illustrates a flowchart of a method for service transmission according to an embodiment of the present disclosure.

FIG. 2 schematically illustrates a flowchart of a method for service transmission according to an embodiment of the present disclosure. The method may be applied, for example, to the UE 1 in FIG. 1.

Referring to FIG. 2, the method 10 include that in Step S102, a UE determines which service is allowed to be transmitted on the configured grant resource, according to a first indication information.

In embodiments of the present disclosure, the method 10 may further comprise: in Step 104, the UE transmits the service allowed to be transmitted on the configured grant resource.

The first indication information may be, for example, RRC signaling, or may be an RRC information element (IE) in the RRC signaling, or may also be the indication information carried in the Downlink Control Information (DCI) signaling which is transmitted on PDCCH.

The UE may be configured to classify data according to service requirements or characteristics of the data. For example, the SDAP layer is responsible for classifying different service types using different QoS flows which are identified by QFI. Some data with a very low latency quality of service (QoS) target may be classified as the above-mentioned URLLC service. And some data which is not reliant on real-time transmission may be classified as the above-mentioned eMBB service. The PDCP layer is responsible for mapping QoS flows into different radio bearers, and one radio bearer corresponds to one logical channel. In other words, different service data may be carried in different logical channels.

In embodiments of the present disclosure, the first indication information is included in the configuration information for each logical channel and is used to indicate whether data in the logical channel is allowed or permitted to be transmitted on the configured grant. The configuration information of per logical channel may be, for example, IE-LogicalChannelConfig in RRC signaling, or may be an IE newly defined based on per logical channel, but the present disclosure is not limited to the examples described herein. As the requirement may be the same for the data transmitted on the same logical channel, the UE may be configured to transmit data with different characteristics such as latency requirements or QoS requirements on the different logical channel. For example, a URLLC service with strict delay requirements may be transmitted on one logical channel, and an eMBB service that is not sensitive to delay requirements may be transmitted on another logical channel. Therefore, the UE can configure a service whether to be allowed or permitted to use the configured grant based on per logical channel, in order to determine which service is capable of being transmitted on the configured grant resource, i.e., to determine the mapping relationship between a service and the configured grant.

For example, the first indication information may be defined or specified in an IE-LogicalChannelConfig (e.g., in the configuredGrantType1Allowed element in IE-Logical-ChannelConfig) to indicate whether the logical channel configured by the IE-LogicalChannelConfig is allowed or permitted to use the configured grant. That is, the first indication information is used to indicate whether the MAD SDU from the logical channel is allowed or permitted to be transmitted on the resource indicated by the configured grant.

The first indication information may be, for example, an indication with a Boolean type. If the first indication information is configured to be true, it indicates that uplink MAC SDUs (Service Data Unit) from this logical channel can be transmitted on the configured grant; if the first indication information is configured to be false, it indicates that uplink MAC SDUs from this logical channel cannot be transmitted on the configured grant.

Optionally, the first indication information may also be defined or specified as an indication having an enumerated type whose valid value is set to "true." And whether or not the configured grant is allowed to be used by this logical channel may be indicated by its presence. For example, if present, it indicates that uplink MAC SDUs from this logical channel cannot be transmitted on the configured grant.

Further, the first indication information may also be used to indicate whether the logical channel is allowed to use the configured grant type 1 and/or the configured grant type 2, respectively.

The first indication information may, for example, include two indications with a Boolean type, respectively. The indication for configured grant type 1 is used to indicate whether the logical channel is allowed to use the configured grant type 1, and the indication for configured grant type 2 is used to indicate whether the logical channel is allowed to use the configured grant type 2. If the indication for configured grant type 1 is configured to be true, it indicates that uplink MAC SDUs (Service Data Unit) from this logical channel can be transmitted on the configured grant type 1; if it is configured to be false, it indicates that uplink MAC SDUs from this logical channel cannot be transmitted on the configured grant type 1. Similarly, if the indication for configured grant type 2 is configured to be true, it indicates that uplink MAC SDUs (Service Data Unit) from this logical channel can be transmitted on the configured grant type 2; if it is configured to be false, it indicates that uplink MAC SDUs from this logical channel cannot be transmitted on the configured grant type 2.

Optionally, the first indication information may also be defined or specified as an indication having an enumerated type whose valid values may include the type of configured grant that it allows, such as "configured grant type 1", "configured grant type 2" and "configured grant type 1 and type 2" etc. For example, if only configured grant type 1 is allowed, the first indication information may be configured to be "configured grant type 1"; if only configured grant type 2 is allowed, the first indication information may be configured to be "configured grant type 2"; and if both configured grant type 1 and type 2 allowed, the first indication information may be configured to be "configured grant type 1 and type 2".

Optionally, the first indication information may also include two indications having an enumerated type respectively whose valid value being set to "true". And whether or not the configured grant type 1 and/or configured grant type 2 is allowed to be used by this logical channel may be indicated by its presence. For example, if the indication for configured grant type 1 present, it indicates that uplink MAC SDUs from this logical channel cannot be transmitted on the configured grant type 1. And if the indication for configured grant type 2 present, it indicates that uplink MAC SDUs from this logical channel cannot be transmitted on the configured grant type 2.

Further, the first indication information may also be configured to indicate whether or not to allow the use of the dynamic grant by the logical channel.

For example, the first indication information may be used to indicate a list of grants allowed to be used by the logical channel. It may also be defined or specified as an indication having an enumerated type whose valid values may include the type of configured grant that it allows, such as "configured grant type 1", "configured grant type 2", "dynamic grant", "configured grant type 1 and type 2", "configured grant type 1 and dynamic grant", "configured grant type 2 and dynamic grant" and "configured grant type 1 and type 2 and dynamic grant" etc. For example, if only configured grant type 1 is allowed, the first indication information may be configured to be "configured grant type 1"; if only configured grant type 2 is allowed, the first indication information may be configured to be "configured grant type 2"; if only dynamic grant is allowed, the first indication information may be configured to be "dynamic grant"; if both configured grant type 1 and type 2 allowed, the first indication information may be configured to be "configured grant type 1 and type 2"; and so on.

Optionally, the first indication information may also include three indications with a Boolean type to indicate whether or not the configured grant type 1, configured grant type 2 and/or dynamic grant is allowed to be used by this logical channel, respectively. If the indication for configured grant type 1 is configured to be true, it indicates that uplink MAC SDUs (Service Data Unit) from this logical channel can be transmitted on the configured grant type 1; if it is configured to be false, it indicates that uplink MAC SDUs from this logical channel cannot be transmitted on the configured grant type 1. Similarly, if the indication for configured grant type 2 is configured to be true, it indicates that uplink MAC SDUs (Service Data Unit) from this logical channel can be transmitted on the configured grant type 2; if it is configured to be false, it indicates that uplink MAC SDUs from this logical channel cannot be transmitted on the configured grant type 2. And if the indication for dynamic grant is configured to be true, it indicates that uplink MAC SDUs (Service Data Unit) from this logical channel can be transmitted on the dynamic grant; if it is configured to be false, it indicates that uplink MAC SDUs from this logical channel cannot be transmitted on the dynamic grant.

Optionally, the first indication information may also include three indications having an enumerated type respectively whose valid value being set to "true." And whether or not the configured grant type 1, configured grant type 2 and/or dynamic grant is allowed to be used by this logical channel may be indicated by its presence. For example, if the indication for configured grant type 1 present, it indicates that uplink MAC SDUs from this logical channel cannot be transmitted on the configured grant type 1. If the indication for configured grant type 2 present, it indicates that uplink MAC SDUs from this logical channel cannot be transmitted on the configured grant type 2. And if the indication for dynamic grant present, it indicates that uplink MAC SDUs from this logical channel cannot be transmitted on the dynamic grant.

In addition, the first indication information may also be a newly defined or specified IE per logical channel. The specific indication manner is as described above, and details are not described herein again.

Since the network device does not clearly understand the requirements of services to be transmitted by a terminal device, dynamic resources are usually scheduled according to the SR (Scheduling Request) or BSR (Buffer Status Report) previously transmitted by the terminal device. If the previously transmitted SR or BSR indicates an eMBB service, whose transmission delay is not sensitive and amount of data is large, to be transmitted, The allocated dynamic time domain resource may be only 1 time slot (typical configuration). If there are URLLC services to be transmitted and the scheduled dynamic resource collides with the configured grant resource in the time domain, then the dynamic resource will have a higher priority than the configured grant according to the current protocol, and the dynamic resource will be used to transmit the URLLC service. However, since the URLLC service may require a large transmission time due to the large amount of data to be transmitted each time, if the dynamic resource is used, it may fail to meet the delay requirement of the URLLC service.

Accordingly, the present disclosure further provides a conflict resolution method for uplink transmission resources. If a logical channel is configured such that a MAC SDU from the logical channel can be transmitted either on configured grant (type 1 and/or type 2) or on dynamic grant, when the configured grant and the dynamic grant conflict on the time domain, the MAC SDU from this logical channel should be transmitted on the configured grant.

In embodiments of the present disclosure, the first indication information includes at least one of TTI (Transmission Time Interval) length, PDSCH type, periodicity, or MCS table.

In embodiments of the present disclosure, when the service allowed to be transmitted on the resource indicated by the configured grant resource is URLLC service, the first indication information comprises at least one of the following information: short TTI length, PDSCH type B, or configuration of MCS table for URLLC service.

In embodiments of the present disclosure, the first indication information includes at least one of first sub-indication information, second sub-indication information, and third sub-indication information. The first sub-indication information may be used to indicate the length of each of the configured grant resource in the time domain. The first sub-indication information may be, for example, the configuration timeDomainAllocation in IE-ConfiguredGrantConfig; or a newly defined field in IE-ConfiguredGrantConfig or a newly defined IE in the RRC signaling. The unit of the length indicated by the first sub-indication information may be symbols, slots, or other time units. The second sub-indication information may be used to indicate the periodicity of the configured grant resource. The second sub-indication information may be, for example, the configuration periodicity in IE-ConfiguredGrantConfig; or a newly defined field in IE-ConfiguredGrantConfig, or a newly defined IE in the RRC signaling. The unit of the length indicated by the second sub-indication information may be symbols, slots, or other time units. The third sub-indication information may be used to indicate the MCS (Modulation and Coding Scheme) table the UE shall use for the configured grant resource. The third sub-indication information may be, for example, the configuration mcs-table in IE-ConfiguredGrantConfig; or a newly defined field in IE-ConfiguredGrantConfig, or a newly defined IE in the RRC signaling. According to at least one of the first sub-indication information, the second sub-indication information, and the third sub-indication information, a service type that is allowed to be transmitted on the configured grant may be determined.

For example, if the length indicated by the first sub-indication information is less than or equal to a predefined first threshold (The unit of the first threshold should be the same as the unit of the length indicated by the first sub-indication information.), the first service type (e.g., URLLC service) is allowed to be transmitted on the configured grant; otherwise, second service type (e.g., the eMBB service) is allowed to be transmitted on the configured grant. The first service type has stricter delay requirements than the second service type.

Or, if the length indicated by the first sub-indication information is less than or equal to the first threshold, both the first service type and second service type are allowed to be transmitted on the conjured uplink grants; otherwise, the second service type is allowed to be transmitted on the configured grant resource; and the first service type has stricter delay requirements than the second service type.

In addition, if the length indicated by the second sub-indication information is less than or equal to a predefined second threshold (The unit of the second threshold should be the same as the unit of the length indicated by the second sub-indication information.), the first service type (e.g., URLLC service) is allowed to be transmitted on the configured grant; otherwise, the second service type (e.g., the eMBB service) is allowed to be transmitted on the configured grant. The first service type has stricter delay requirements than the second service type.

Or, if the length indicated by the second sub-indication information is less than or equal to the second threshold, both the first service type and second service type are allowed to be transmitted on the configured grant resource; otherwise, the second service type is allowed to be transmitted on the configured grant resource; and the first service type has stricter delay requirements than the second service type.

In addition, if the value indicated by the third sub-information is configured as a predefined MCS (e.g., qam64LowSE), the first service type (e.g., URLLC service) is allowed to be transmitted on the configured grant; otherwise, the second service type (e.g., the eMBB service) is allowed to be transmitted on the configured grant. The first service type has stricter delay requirements than the second service type.

Or, if the value indicated by the third sub-information is configured as the predefined MCS, both the first service type and second service type are allowed to be transmitted on the configured grant resource; otherwise, the second service type is allowed to be transmitted on the configured grant resource; and the first service type has stricter delay requirements than the second service type.

The foregoing rules may be defined in the protocol and be known by the terminal device and the network device in advance or may be configured by the network device through, for example, RRC signaling. If the rules are configured by the network device, the foregoing threshold (e.g., M symbols and/or N symbols) may be adjusted according to information such as the current network load and the resource request report of the terminal device.

In embodiments of the present disclosure, the first indication information may include grant configuration information, e.g., IE-ConfiguredGrantConfig or a newly defined or specified IE, where the grant configuration information may include a service indication to indicate which service is allowed to use the configured grant. The configured grant may be configured grant type 1 and/or configured grant type 2. For example, for configured grant type 1, the service indication is configured to be the URLLC service, which means that only the URLLC service is allowed to be transmitted on configured grant type 1; and/or, for configured grant type 2, the service indication is configured to be the eMBB service, which means that only the eMBB service is allowed to be transmitted on configured grant type 1. This is merely an example, and the present disclosure is not limited thereto.

In addition, the matching relationship between the service type and the configured grant type may also be agreed in advance in the protocol. For example, For configured grant type 1, the URLLC service is always assumed. And for configured grant type 2, the eMBB service is always assumed.

As mentioned above, with the configured grant type 2, RRC defines the periodicity of the configured grant while PDCCH addressed to CS-RNTI can either signal and activate the configured grant, or deactivate it; i.e., a PDCCH addressed to CS-RNTI indicates that the uplink grant can be implicitly reused according to the periodicity defined by RRC, until deactivated.

For the configured grant type 2, the present disclosure also provides a method for determining a service type by physical layer signaling. The first indication information may be a DCI for activating the type 2 grant, and the allowed service type is determined according to the RNTI scrambled for the DCI. For example, for configured grant type 2, specific RNTIs can be defined and be used for DCI signaling for configured grant for URLLC and eMBB service. For example, CS-URLLC-RNTI is used for DCI signaling for configured grant for URLLC; and CS-eMBB-RNTI is used for DCI signaling for configured grant for eMBB. That is, if the DCI used to activate the configured grant type 2 is scrambled by CS-URLLC-RNTI, the configured grant type 2 is used for the transmission of the URLLC service. And if the DCI used to activate the configured grant type 2 is scrambled by CS-eMBB-RNTI, the configured grant type 2 is used for the transmission of the eMBB service.

In addition, the first indication information may be a DCI for activating the type 2 grants, and the allowed service type is determined according to the DCI format. Currently, two DCI formats (DCI format0_0 and DCI_format0_1) are defined in the physical layer protocol TS 38.212. For configured grant type 2, specific DCI formats can be defined and be used for DCI signaling for configured grant for URLLC and eMBB service. For example, if DCI format 0_0 is used for the DCI used to activate the configured grant type 2, the configured grant type 2 is used for the transmission of the URLLC service; and if DCI format 0_1 is used for the DCI used to activate the configured grant type 2, the configured grant type 2 is used for the transmission of the eMBB service.

Or, a new DCI format may be defined for scheduling of PUSCH (Physical uplink shared channel). For example, if the newly defined DCI format is used for the DCI used to activate the configured grant type 2, the configured grant type 2 is used for the transmission of the URLLC service; and if DCI format 0_0 or DCI_format0_1 is used for the DCI used to activate the configured grant type 2, the configured grant type 2 is used for the transmission of the eMBB service.

In embodiments of the present disclosure, the first indication information is RNTI used for DCI signaling of the service allowed to be transmitted on the configured grant resource.

Even for the single service, the uplink transmission data includes uplink service data and feedbacks such as HARQ A/N, SR, CSI (Channel State Information) etc. And CSI may further include Fast CSI/Normal CSI, CSI part1/CSI part2. The priority between these uplink transmission data is also not clearly defined in the current protocol. Therefore, the present disclosure also provides a method for solving uplink data conflicts.

In embodiments of the present disclosure, it is specified that the priority of the uplink service data is higher than the priority of the SR, and the priority of the SR is further higher than the priority of the HARQ A/N. The highest priority for service data may ensure that the initial transmission of the service data can be transmitted in a timely manner. And the higher priority for SR than A/N may ensure that the service data is preferentially scheduled in time.

In embodiments of the present disclosure, it is specified that the priority of the uplink service data is higher than the priority of the SR, and the priority of the SR equals the priority of the HARQ A/N. The SR and A/N have the same priority, which may ensure timely uplink service data scheduling and avoid redundant downlink retransmissions. SR and A/N can be combined for being transmitted, which is applicable to SR and A/N with a small amount of information data.

In embodiments of the present disclosure, it is specified that the priority of Fast CSI is higher than the priority of the A/N. Fast CSI is used to improve the efficiency of URLLC transmission and can even be considered to contain implicit A/N transmissions. That is, the terminal device can determine whether the data is correctly received according to Fast CSI. For example, if the MCS level used by Fast CSI is lower than that used by the downlink data, the uplink data retransmission is performed; otherwise, the uplink data needs not to be directly retransmitted.

It should be noted that the above-mentioned eMBB and URLLC services are merely examples, and other services with different QoS requirements are also applicable to the above method embodiments.

The method of the present disclosure has been described above with reference to FIG. 2, and the apparatus and the device of the present disclosure will be described below with reference to FIG. 3 to FIG. 4.

Figure 3:
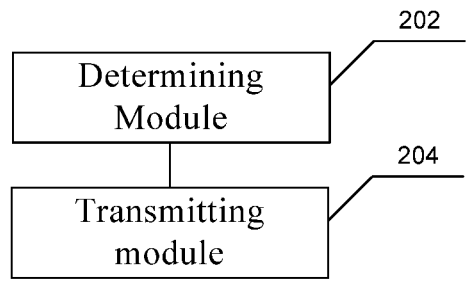
FIG. 3 schematically illustrates an apparatus for determining uplink grants for services according to an embodiment of the present disclosure.

FIG. 3 schematically illustrates an apparatus for determining uplink grants for services according to an embodiment of the present disclosure. The apparatus may be applied, for example, to the UE 1 in FIG. 1.

Referring to FIG. 3, the apparatus 20 includes a determining module 202 and a transmitting module 204.

Wherein the determining module 202 is configured to determine which service is allowed to be transmitted on configured grant resource, according to received first indication information.

The transmitting module 204 is configured to transmit the service allowed to be transmitted on the resource indicated by the configured grant resource.

In embodiments of the present disclosure, the first indication information is included in the configuration information for each logical channel and is configured to indicate whether MAC SDUs from the configured logical channel is allowed to be transmitted on the configured grant resource.

In embodiments of the present disclosure, the configured grant resource include resource configured for configured grant type 1 and/or resource configured for configured grant type 2; and the first indication information is configured to indicate whether MAC SDUs from the logical channel is allowed to be transmitted on the resource configured for configured grant type 1 and/or the resource configured for configured grant type 2, respectively.

In embodiments of the present disclosure, the first indication information is further configured to indicate whether MAC SDUs from the logical channel is allowed to be transmitted on the dynamic grant resource.

In embodiments of the present disclosure, the determining module 202 is configured to determine that the if a logical channel is configured that MAC SDUs from the logical channel can be transmitted either on the configured grants or on the dynamic grant resource when the configured grant resource and the dynamic grant resource conflict on the time domain, the MAC SDU from the logical channel should be transmitted on the configured grant resource.

In embodiments of the present disclosure, the first indication information includes at least one of first sub-indication information, second sub-indication information, and third sub-indication information; the first sub-indication information is configured to indicate the length of each of the configured grant resource in the time domain; the second sub-indication information is configured to indicate periodicity of the configured grant resource; and the third sub-indication information is configured to indicate the MCS table a terminal device shall use for the configured grant resource.

In embodiments of the present disclosure, the determining module 202 is configured to determine that if the length indicated by the first sub-indication information is less than or equal to a predefined first threshold, the first service type is allowed to be transmitted on the configured grant resource; otherwise, the second service type is allowed to be transmitted on the configured grant.

In embodiments of the present disclosure, the determining module 202 is configured to determine that if the length indicated by the first sub-indication information is less than or equal to a predefined first threshold, both first service type and second service type are allowed to be transmitted on the conjured uplink grants; otherwise, the second service type is allowed to be transmitted on the configured grant resource.

In embodiments of the present disclosure, the determining module 202 is configured to determine that if the length indicated by the second sub-indication information is less than or equal to a predefined second threshold, the first service type is allowed to be transmitted on the configured grant resource; otherwise, the second service type is allowed to be transmitted on the configured grant resource.

In embodiments of the present disclosure, the determining module 202 is configured to determine that if the length indicated by the second sub-indication information is less than or equal to a predefined second threshold, both first service type and second service type are allowed to be transmitted on the configured grant resource; otherwise, the second service type is allowed to be transmitted on the configured grant resource.

In embodiments of the present disclosure, the determining module 202 is configured to determine that if the value of the third sub-information is configured as a predefined MCS, the first service type is allowed to be transmitted on the configured grant resource; otherwise, the second service type is allowed to be transmitted on the configured grant resource.

In embodiments of the present disclosure, the determining module 202 is configured to determine that if the value indicated by the third sub-information is configured as a predefined MCS, both first service type and second service type are allowed to be transmitted on the configured grant resource; otherwise, the second service type is allowed to be transmitted on the configured grant resource.

In embodiments of the present disclosure, the first service type has stricter delay requirements than the second service type.

In embodiments of the present disclosure, the first indication information includes grant configuration information, and the grant configuration information includes a service indication, which is configured to indicate which service is allowed to be transmitted on the configured grant resource.

In embodiments of the present disclosure, the configured grant resource include resource configured for configured grant type 1 and/or resource configured for configured grant type 2.

In embodiments of the present disclosure, the first indication information is a DCI for activating configured grant type 2, and the determining module 202 is configured to determine which service is allowed to be transmitted on the configured grant resource is determined according to the RNTI scrambled for the DCI, and/or determined according to the DCI format.

Figure 4:
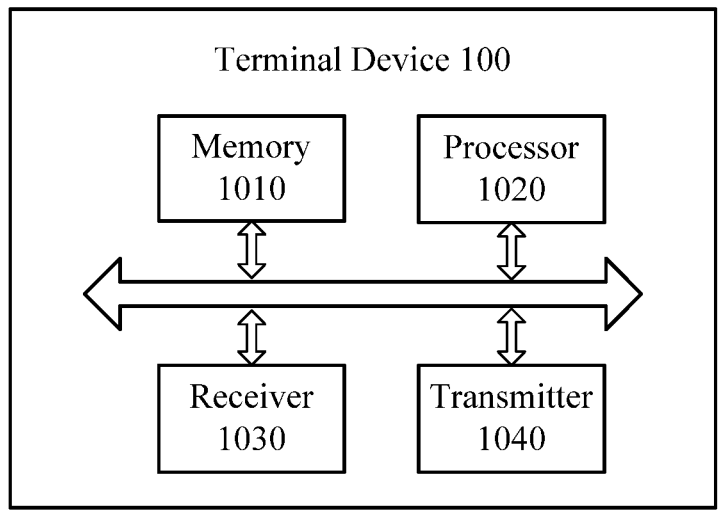
FIG. 4 schematically illustrates a terminal device according to an embodiment of the present disclosure.

FIG. 4 schematically illustrates a terminal device according to an embodiment of the present disclosure. The terminal device may be the UE 1 in FIG. 1.

Referring to FIG. 4, the terminal device 100 includes a processor 1020, a memory 1010, a receiver 1030, and a transmitter 1040.

The memory 1010 is configured to store a program. The receiver 1030 is configured to receive first indication information. The processor 1020 is configured to execute the program stored by the memory 1010. The transmitter 1040 is configured to transmit the service allowed to be transmitted on the configured grant resource.

When the processor 1020 executes the program stored in the memory 1010, the processor 1020 is configured to determine which service is allowed to be transmitted on configured grant resource, according to received first indication information.

In embodiments of the present disclosure, the first indication information is included in the configuration information for each logical channel and is configured to indicate whether MAC SDUs from the configured logical channel is allowed to be transmitted on the configured grant resource.

In embodiments of the present disclosure, the configured grant resource include resource configured for configured grant type 1 and/or resource configured for configured grant type 2; and the first indication information is configured to indicate whether MAC SDUs from the logical channel is allowed to be transmitted on the resource configured for configured grant type 1 and/or the resource configured for configured grant type 2, respectively.

In embodiments of the present disclosure, the first indication information is further configured to indicate whether MAC SDUs from the logical channel is allowed to be transmitted on the dynamic grant resource.

In embodiments of the present disclosure, the processor 1020 is configured to determine that if a logical channel is configured that MAC SDUs from the logical channel can be transmitted either on the configured grant resource or on the dynamic grant resource when the configured grant resource and the dynamic grant resource conflict on the time domain, the MAC SDU from the logical channel should be transmitted on the configured grant resource.

In embodiments of the present disclosure, the first indication information includes at least one of first sub-indication information, second sub-indication information, and third sub-indication information; the first sub-indication information is configured to indicate the length of the configured grant resources in the time domain; the second sub-indication information is configured to indicate periodicity for the configured grant resource; and the third sub-indication information is configured to indicate the MCS table a terminal device shall use for the configured grant resource.

In embodiments of the present disclosure, the processor 1020 is configured to determine that if the length indicated by the first sub-indication information is less than or equal to a predefined first threshold, the first service type is allowed to be transmitted on the configured grant resource; otherwise, the second service type is allowed to be transmitted on the configured grant resource.

In embodiments of the present disclosure, the processor 1020 is configured to determine that if the length indicated by the first sub-indication information is less than or equal to a predefined first threshold, both the first service type and second service type are allowed to be transmitted on the conjured uplink grants; otherwise, the second service type is allowed to be transmitted on the configured grant resource.

In embodiments of the present disclosure, the processor 1020 is configured to determine that if the length indicated by the second sub-indication information is less than a predefined second threshold, the first service type is allowed to be transmitted on the configured grant resource; otherwise, the second service type is allowed to be transmitted on the configured grant resource.

In embodiments of the present disclosure, the processor 1020 is configured to determine that if the length indicated by the second sub-indication information is less than or equal to a predefined second threshold, both the first service type and second service type are allowed to be transmitted on the configured grant resource; otherwise, the second service type is allowed to be transmitted on the configured grant resource.

In embodiments of the present disclosure, the processor 1020 is configured to determine that if the value of the third sub-information is configured as a predefined MCS, the first service type is allowed to be transmitted on the configured grant resource; otherwise, the second service type is allowed to be transmitted on the configured grant resource.

In embodiments of the present disclosure, the processor 1020 is configured to determine that if the value indicated by the third sub-information is configured as a predefined MCS, both the first service type and second service type are allowed to be transmitted on the configured grant resource; otherwise, the second service type is allowed to be transmitted on the configured grant resource.

In embodiments of the present disclosure, the first service type has stricter delay requirements than the second service type.

In embodiments of the present disclosure, the first indication information includes grant configuration information, and the grant configuration information includes a service indication, which is configured to indicate which service is allowed to be transmitted on the configured grant resource.

In embodiments of the present disclosure, the configured grant resource include resource configured for configured grant type 1 and/or resource configured for configured grant type 2.

In embodiments of the present disclosure, the first indication information is a DCI for activating configured grant type 2, and the processor 1020 is configured to determine which service is allowed to be transmitted on the configured grant resource is determined according to the RNTI scrambled for the DCI, and/or determined according to the DCI format.

In embodiments of the present disclosure, the transmitter 1040 is configured to transmit the service data on allowed uplink grants.

Exemplary embodiments have been specifically shown and described as above. It will be appreciated by those skilled in the art that the disclosure is not limited the disclosed embodiments; rather, all suitable modifications and equivalent which come within the spirit and scope of the appended claims are intended to fall within the scope of the disclosure.

What is claimed is:
1. A method for service transmission, comprising:
receiving, by a terminal device, first indication information sent by a network device, wherein the first indication information is comprised in configuration information of a logical channel corresponding to a service and is used to indicate whether the terminal device is allowed to transmit Medium Access Control (MAC) Service Data Units (SDUs) from the logical channel on part or all of grant resource configured for the terminal device, and the first indication information is further configured to indicate whether the MAC SDUs from the logical channel are allowed to be transmitted on dynamic grant resource; and when the terminal device determines that the MAC SDUs from the logical channel are allowed to be transmitted on the part or all of grant resource according to the first indication information, transmitting, by the terminal device, the MAC SDUs from the logical channel to the network device.

2. The method according to claim 1, wherein the first indication information being comprised in the configuration information of the logical channel corresponding to the service comprises: the first indication information being comprised in a LogicalChannelConfig information element.

3. The method according to claim 1, wherein the first indication information comprises grant configuration information, the grant configuration information comprising a service indication that is configured to indicate which service is allowed to be transmitted on the configured grant resource.

4. The method according to claim 1, wherein the first indication information being used to indicate whether the MAC SDUs from the logical channel are allowed to be transmitted on the part or all of the configured grant resource comprises: the first indication information being configured to indicate whether the MAC SDUs from the logical channel are allowed to be transmitted on the configured grant resource configured by the network device for the terminal device.

5. The method according to claim 1, wherein the configured grant resource comprises resource configured for configured grant type 1 or resource configured for configured grant type 2; and the first indication information is further configured to indicate whether the MAC SDUs from the logical channel are allowed to be transmitted on the resource configured for the configured grant type 1 or the resource configured for the configured grant type 2.

6. A terminal device, comprising: a receiver; and a processor, wherein the receiver is configured to receive first indication information sent by a network device, wherein the first indication information is comprised in configuration information of a logical channel corresponding to a service and is used to indicate whether the terminal device is allowed to transmit Medium Access Control (MAC) Service Data Units (SDUs) from the logical channel on part or all of grant resource configured for the terminal device, and the first indication information is further configured to indicate whether the MAC SDUs from the logical channel are allowed to be transmitted on dynamic grant resource; and the processor is configured to, when it is determined that the MAC SDUs from the logical channel are allowed to be transmitted on the part or all of grant resource according to the first indication information, transmit the MAC SDUs from the logical channel to the network device.

7. The terminal device according to claim 6, wherein the first indication information being comprised in the configuration information of the logical channel corresponding to the service comprises: the first indication information being comprised in a LogicalChannelConfig information element.

8. The terminal device according to claim 6, wherein the first indication information comprises grant configuration information, the grant configuration information comprising a service indication that is configured to indicate which service is allowed to be transmitted on the configured grant resource.

9. The terminal device according to claim 6, wherein the first indication information being used to indicate whether the MAC SDUs from the logical channel are allowed to be transmitted on the part or all of the configured grant resource comprises: the first indication information being configured to indicate whether the MAC SDUs from the logical channel are allowed to be transmitted on the configured grant resource configured by the network device for the terminal device.

10. The terminal device according to claim 6, wherein the configured grant resource comprises resource configured for configured grant type 1 or resource configured for configured grant type 2; and the first indication information is configured to indicate whether the MAC SDUs from the logical channel are allowed to be transmitted on the resource configured for the configured grant type 1 or the resource configured for the configured grant type 2, respectively.

11. A method for service transmission, comprising:

configuring, by a network device, a grant resource for a terminal device; and sending, by the network device, first indication information to the terminal device, wherein the first indication information is comprised in configuration information of a logical channel corresponding to a service and is used to indicate whether Medium Access Control (MAC) Service Data Units (SDUs) from the logical channel are allowed to be transmitted on part or all of the configured grant resource, and the first indication information is further configured to indicate whether the MAC SDUs from the logical channel are allowed to be transmitted on dynamic grant resource.

12. The method according to claim 11, wherein the first indication information being comprised in the configuration information of the logical channel corresponding to the service comprises: the first indication information being comprised in a LogicalChannelConfig information element.

13. The method according to claim 11, wherein the first indication information comprises grant configuration information, the grant configuration information comprising a service indication that is configured to indicate which service is allowed to be transmitted on the configured grant resource.

14. The method according to claim 11, wherein the first indication information being used to indicate whether the MAC SDUs from the logical channel are allowed to be transmitted on the part or all of the configured grant resource comprises: the first indication information being configured to indicate whether the MAC SDUs from the logical channel are allowed to be transmitted on the configured grant resource configured by the network device for the terminal device.

15. The method according to claim 11, wherein the configured grant resource comprises resource configured for configured grant type 1 or resource configured for configured grant type 2; and the first indication information is configured to indicate whether the MAC SDUs from the logical channel are allowed to be transmitted on the resource configured for the configured grant type 1 or the resource configured for the configured grant type 2.

16. A network device, comprising: a processor and a sender;

wherein the processor is configured to configure a grant resource for a terminal device; and the sender is configured to send first indication information to the terminal device, wherein the first indication information is comprised in configuration information of a logical channel corresponding to a service and is used to indicate whether Medium Access Control (MAC) Service Data Units (SDUs) from the logical channel are allowed to be transmitted on part or all of the configured grant resource, and the first indication information is further configured to indicate whether the MAC SDUs from the logical channel are allowed to be transmitted on dynamic grant resource.

17. The network device according to claim 16, wherein the first indication information being comprised in the configuration information of the logical channel corresponding to the service comprises: the first indication information being comprised in a LogicalChannelConfig information element.

18. The network device according to claim 16, wherein the first indication information comprises grant configuration information, the grant configuration information comprising a service indication that is configured to indicate which service is allowed to be transmitted on the configured grant resource.

19. The network device according to claim 16, wherein the first indication information being used to indicate whether the MAC SDUs from the logical channel are allowed to be transmitted on the part or all of the configured grant resource comprises: the first indication information being configured to indicate whether the MAC SDUs from the logical channel are allowed to be transmitted on the configured grant resource configured by the network device for the terminal device.

20. The network device according to claim 16, wherein the configured grant resource comprises resource configured for configured grant type 1 or resource configured for configured grant type 2; and the first indication information is configured to indicate whether the MAC SDUs from the logical channel are allowed to be transmitted on the resource configured for the configured grant type 1 or the resource configured for the configured grant type 2.

* * * * *